US011700657B2

(12) United States Patent
Bogenfeld et al.

(10) Patent No.: US 11,700,657 B2
(45) Date of Patent: Jul. 11, 2023

(54) TECHNIQUES FOR MULTIPATH BUNDLING AND DETERMINING WI-FI CONNECTIONS FOR MULTIPATH BUNDLING

(71) Applicant: Deutsche Telekom AG, Bonn (DE)

(72) Inventors: Eckard Bogenfeld, Carlsberg (DE); Markus Amend, Nidda (DE)

(73) Assignee: DEUTSCHE TELEKOM AG, Bonn (DE)

( * ) Notice: Subject to any disclaimer, the term of this patent is extended or adjusted under 35 U.S.C. 154(b) by 148 days.

(21) Appl. No.: 16/981,749

(22) PCT Filed: Mar. 11, 2019

(86) PCT No.: PCT/EP2019/055956
§ 371 (c)(1),
(2) Date: Sep. 17, 2020

(87) PCT Pub. No.: WO2019/179801
PCT Pub. Date: Sep. 26, 2019

(65) Prior Publication Data
US 2021/0127440 A1 Apr. 29, 2021

(30) Foreign Application Priority Data
Mar. 19, 2018 (EP) ..................... 18162495

(51) Int. Cl.
*H04B 7/185* (2006.01)
*H04W 76/15* (2018.01)
(Continued)

(52) U.S. Cl.
CPC ............. *H04W 76/15* (2018.02); *H04L 69/14* (2013.01); *H04W 84/12* (2013.01)

(58) Field of Classification Search
CPC .......... H04W 76/04; H04W 8/08; H04L 67/12
See application file for complete search history.

(56) References Cited

U.S. PATENT DOCUMENTS

2015/0245409 A1* 8/2015 Medapalli ............. H04W 76/15
370/329
2016/0127899 A1* 5/2016 Jabara .................... H04W 4/02
455/411
(Continued)

FOREIGN PATENT DOCUMENTS

EP 3119057 A1 1/2017
WO WO 2015127294 A1 8/2015

OTHER PUBLICATIONS

PR Newsire, "Instabridge Makes Entering Wi-Fi Passwords a Thing of the Past," *PR Newswire* (Mar. 5, 2013). XP055490500.
(Continued)

*Primary Examiner* — Romani Ohri
(74) *Attorney, Agent, or Firm* — Leydig, Voit & Mayer, Ltd.

(57) ABSTRACT

A multipath bundling system includes: a mobile terminal, comprising a Wireless Technologies Database (WTD) and a processor configured to run a multipath bundling protocol (MBP); and a network entity, wherein the network entity is an external server or a multipath bundling server, and wherein the network entity comprises a Self-Learning Wi-Fi Database (SLWD). The mobile terminal and/or the network entity is configured to run a Search-Compare-Assign Algorithm (SCAA). Running the SCAA includes: receiving input data from the WTD and/or the SLWD, the input data indicating information about wireless technologies, including information about at least one cellular connection and at least one Wi-Fi connection, usable by the mobile terminal for multipath bundling; and determining at least one Wi-Fi connection usable by the mobile terminal for multipath bundling based on the received input data in accordance with an optimization criterion.

10 Claims, 5 Drawing Sheets

(51) Int. Cl.
 *H04L 69/14* (2022.01)
 *H04W 84/12* (2009.01)

(56) References Cited

U.S. PATENT DOCUMENTS

2016/0284140 A1* 9/2016 Klein ................. G06Q 10/1095
2016/0295473 A1* 10/2016 Lee ................... H04W 36/0033
2018/0240060 A1* 8/2018 Graham ........... G06Q 10/06316

OTHER PUBLICATIONS

Durmus Yunus, et al. "Wifi Authentication through Social Networks—A Decentralized and Context-Aware Approach," *IEEE International Conference on Pervasive Computing and Communication Workshops*: 532-538 (Mar. 24, 2014). XP032594864.

* cited by examiner

TECHNIQUES FOR MULTIPATH BUNDLING AND DETERMINING WI-FI CONNECTIONS FOR MULTIPATH BUNDLING

CROSS-REFERENCE TO PRIOR APPLICATIONS

This application is a U.S. National Phase Application under 35 U.S.C. § 371 of International Application No. PCT/EP2019/055956, filed on Mar. 11, 2019, and claims benefit to European Patent Application No. EP 18162495.8, filed on Mar. 19, 2018. The International Application was published in English on Sep. 26, 2019 as WO 2019/179801 A1 under PCT Article 21(2).

TECHNICAL FIELD

The disclosure relates to techniques for multipath bundling and determining Wi-Fi connections for multipath bundling. The disclosure further relates to a multipath bundling system and a multipath bundling method. In particular, the disclosure relates to a system to optimize the services for mobile end-devices by using multipath bundling and a self-learning Wi-Fi access database.

BACKGROUND

Hybrid Access (HA) combines at least two different network links with the same or different network technology, for example it combines access over a fixed network with access over a cellular network, e.g. as shown in FIG. 1.

Multipath bundling combines at least two different network links with the same or different network technology, for example, it combines access over a fixed network with access over a mobile network. Hence, multipath bundling can be advantageously applied in Hybrid Access scenarios as shown in FIG. 1, for example.

Multipath bundling can be realized with the Multipath Transmission Control Protocol (MPTCP) according to "A. Ford and C. Raiciu and M. Handley and O. Bonaventure, "TCP Extensions for Multipath Operation with Multiple Addresses", RFC no. 6824, January 2013" or any other bundling algorithm or protocol. MPTCP itself operates on OSI layer 4. In principle a bundling protocol can be implemented on any layer and depends on the requirements and goals. Nowadays, a mobile terminal (MT) like a smartphone is typically connected to the Internet either via an available Wi-Fi network or via a mobile network, e.g. via the LTE (Long Term Evolution) network.

SUMMARY

In an exemplary embodiment, the present invention provides a multipath bundling system. The multipath bundling system includes: a mobile terminal, comprising a Wireless Technologies Database (WTD) and a processor configured to run a multipath bundling protocol (MBP); and a network entity, wherein the network entity is an external server or a multipath bundling server, and wherein the network entity comprises a Self-Learning Wi-Fi Database (SLWD). The mobile terminal and/or the network entity is configured to run a Search-Compare-Assign Algorithm (SCAA). Running the SCAA includes: receiving input data from the WTD and/or the SLWD, the input data indicating information about wireless technologies, including information about at least one cellular connection and at least one Wi-Fi connection, usable by the mobile terminal for multipath bundling; and determining at least one Wi-Fi connection usable by the mobile terminal for multipath bundling based on the received input data in accordance with an optimization criterion.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
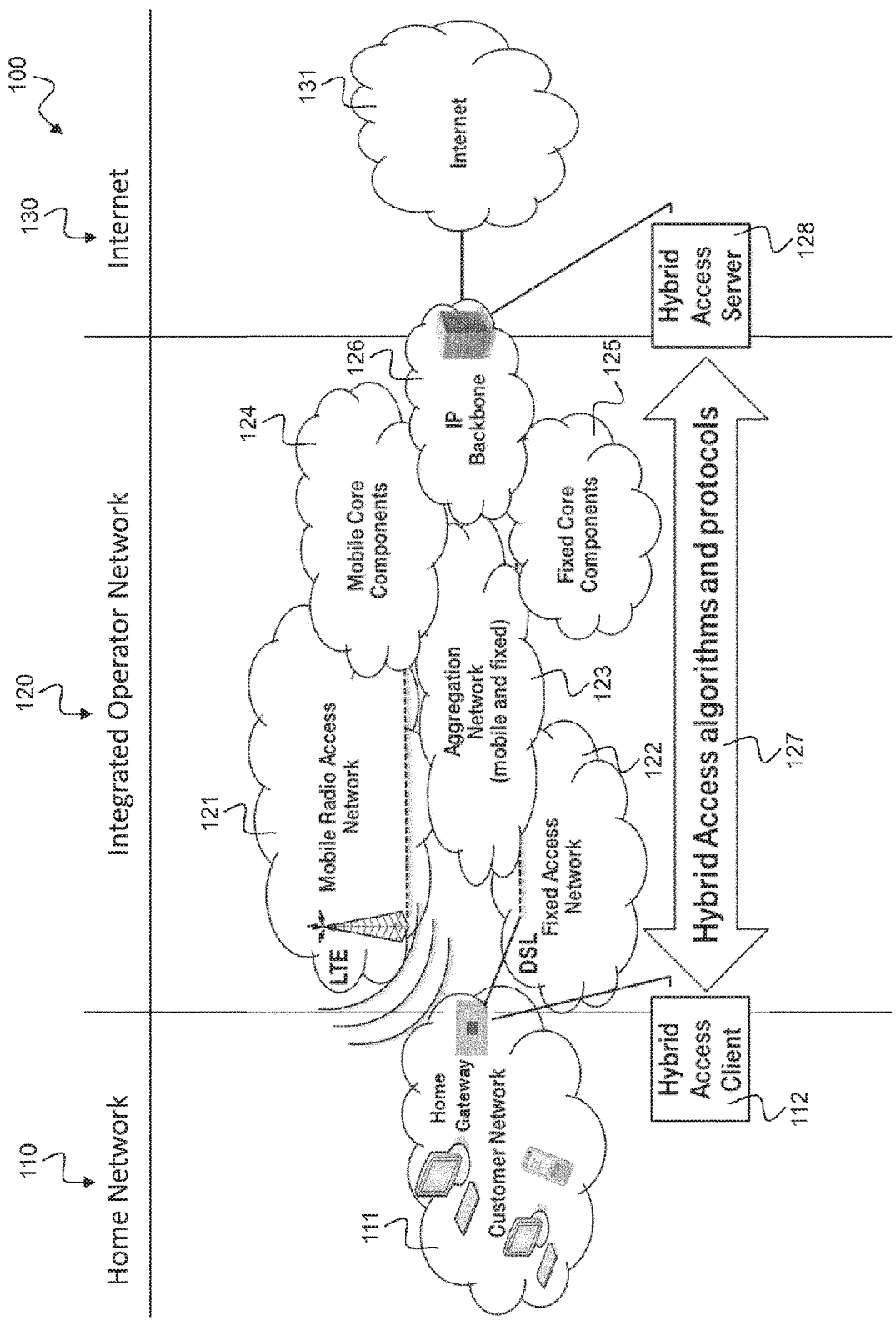
FIG. 1 shows a reference topology 100 for Hybrid Access (HA)

Exemplary embodiments of the present invention provide for efficiently exploiting available Wi-Fi networks for multipath bundling in a mobile terminal with availability of cellular and Wi-Fi connectivity.

Exemplary embodiments of the present invention efficiently exploit Wi-Fi networks for multipath bundling in moving scenarios where the mobile terminal detects a majority of secured Wi-Fi networks with unknown Wi-Fi credentials.

Exemplary embodiments of this disclosure connect Wi-Fi networks and a multipath bundling protocol (MBP) combined with a prioritized traffic routing on a cheaper path for offloading cost intensive paths. Therefore the information about the current Wi-Fi situation are exchanged with an external entity, may be extended with credential management (send, receive, share), weighted and may be applied. Intelligence, like machine learning processes, can be applied to weight the Wi-Fi networks on the external entity and/or the mobile terminal (MT).

The first step is to find the visible or invisible Wi-Fi hotspots in the current environment and select the one with the best performance. If not available locally, the second step is to receive credentials for the selected Wi-Fi from an external resource over the mobile channel or even over an already established Wi-Fi connection. In the third step, the MT can simultaneously connect via both interfaces in order to exploit the implemented multipath bundling with an appropriate traffic steering (e.g. Wi-Fi first).

The methods and systems presented below may be of various types. The individual elements described may be realized by hardware or software components, for example electronic components that can be manufactured by various technologies and include, for example, semiconductor chips, application-specific integrated circuits (ASICs), microprocessors, digital signal processors, integrated electrical circuits, electro-optical circuits and/or passive components.

The devices, systems and methods presented below are capable of transmitting information over a communication network. The term communication network refers to the technical infrastructure on which the transmission of signals takes place. The communication network comprises the switching network in which the transmission and switching of the signals takes place between the stationary devices and platforms of the mobile radio network or fixed network, and the access network in which the transmission of the signals takes place between a network access device and the communication terminal. The communication network can comprise both components of a mobile radio network as well as components of a fixed network. In the mobile network, the access network is also referred to as an air interface and includes, for example, a base station (NodeB, eNodeB, radio cell) with mobile antenna to establish the communication to a communication terminal as described above, for example, a mobile phone or a mobile device with mobile adapter or a machine terminal. In the fixed network, the access network includes, for example, a DSLAM (digital subscriber line access multiplexer) to connect the communication terminals of multiple participants based on wires. Via the switching network the communication can be transferred to other networks, for example other network operators, e.g. foreign networks.

In the following, network protocols, also denoted as communication protocols are described. A network protocol is a system of rules that allow two or more entities of a communications system to transmit information via a communication channel or transmission medium. The network protocol defines the rules "Syntax", "Semantic" and "Synchronization" of communication and possible error detection and correction. Network protocols may be implemented by computer hardware, software, or a combination of both. Communicating systems use well-defined formats for exchanging various messages. Each message has an exact meaning intended to elicit a response from a range of possible responses pre-determined for that particular situation. The specified behavior is typically independent of how it is to be implemented. Communication protocols have to be agreed upon by the parties involved. To reach agreement, a network protocol may be developed into a technical standard. Multiple protocols often describe different aspects of a single communication. A group of (network) protocols designed to work together are known as a (network) protocol suite; when implemented in software they are a (network) protocol stack. Internet communication protocols are published by the Internet Engineering Task Force (IETF). The IEEE handles wired and wireless networking, and the International Organization for Standardization (ISO) handles other types. Network protocols can run as software on a processor or may be implemented as hardware circuits. A multipath bundling protocol is a network protocol that bundles individual network paths to a multipath to provide path diversity and improve data transmission due to the availability of multiple parallel network paths.

In communications and computing systems, the Open Systems Interconnection model (OSI model) defines a conceptual model that characterizes and standardizes the communication functions without regard to its underlying internal structure and technology. Its goal is the interoperability of diverse communication systems with standard protocols. The model partitions a communication system into abstraction layers. The original version of the model defined seven layers: Physical layer (Layer 1), Data Link layer (Layer 2), Network layer (Layer 3), Transport layer (Layer 4), Session layer (Layer 5), Presentation layer (Layer 6) and Application layer (Layer 7).

According to a first aspect the invention relates to a multipath bundling system, comprising: a mobile terminal, comprising a Wireless Technologies Database (WTD) and a processor configured to run a multipath bundling protocol (MBP); a network entity, in particular an external server or a multipath bundling server, reachable over Wi-Fi, cellular or the combination of both (MBP), the network entity comprising a Self-Learning Wi-Fi Database (SLWD); and a Search-Compare-Assign Algorithm (SCAA) running on an entity of the multipath bundling system, in particular on the mobile terminal and/or the network entity, wherein the SCAA is configured to: receive input data from the WTD and/or the SLWD, the input data indicating information about wireless technologies, in particular information about at least one cellular connection and at least one Wi-Fi connection, usable by the mobile terminal for multipath bundling, and determine at least one Wi-Fi connection usable by the mobile terminal for multipath bundling based on the received input data in accordance with an optimization criterion.

Such a multipath bundling system efficiently exploits Wi-Fi networks for multipath bundling, in particular in moving scenarios where the mobile terminal detects a majority of secured Wi-Fi networks with unknown Wi-Fi credentials. The multipath bundling system provides connection of Wi-Fi networks and a multipath bundling protocol (MBP) combined with a prioritized traffic routing on a cheaper path for offloading cost intensive paths. The information about the current Wi-Fi situation can be exchanged with the network directly over Wi-Fi, cellular or both (MBP). Intelligence, like machine learning processes, can be applied to weight the Wi-Fi networks on the network entity and/or the mobile terminal. The system may further apply credential management to improve the Wi-Fi discovery process.

In an exemplary implementation form of the multipath bundling system, the optimization criterion is based on prioritized traffic routing.

This provides the advantage that cheap traffic paths such as Wi-Fi connections can be prioritized over expensive traffic paths such as LTE connections. Cheap means not only cost, but also terms like latency, quality, availability, reliability etc.

In an exemplary implementation form of the multipath bundling system, the optimization criterion is based on offloading data from cost intensive paths to cheaper paths, in particular based on offloading traffic from cellular paths to Wi-Fi paths.

This provides the advantage that data traffic can be arbitrarily distributed over the multipath bundle in order to achieve cost reduction. Cost does not inevitably mean a direct payment, it can also be defined in terms of latency, reliability, quality and many others.

In an exemplary implementation form of the multipath bundling system, the information about wireless technologies comprises at least one of the following: Wi-Fi Service Set Identifier (SSID) of the at least one Wi-Fi connection, credentials of the Wi-Fi SSID, link quality of the Wi-Fi SSID, geolocation of the Wi-Fi SSID, channel characteristics of the at least one cellular connection, information about other wireless technologies than cellular or Wi-Fi, in particular information about at least one Bluetooth connection.

Credentials can also include access which is not protected by common Wi-Fi access approaches like Pre-Shared-Key, further it can support certificate or captive portal or any other kind of access protection, This provides the advantage that the mobile terminal can select the optimal Wi-Fi connection based on a multitude of information. Furthermore it can make use of protected Wi-Fis which cannot be exploited under normal conditions.

In an exemplary implementation form of the multipath bundling system, the mobile terminal is configured to determine at least one Wi-Fi access point in a local environment of the mobile terminal and to store information about the at least one Wi-Fi access point in the WTD of the mobile terminal.

This provides the advantage that the one or more Wi-Fi access points determined by the mobile terminal can be indicated to the network entity and stored in the SLWD, whenever a communication link is available.

In an exemplary implementation form of the multipath bundling system, the mobile terminal, respectively the WTD, is configured to expand the SLWD with the information about the at least one Wi-Fi access point.

This provides the advantage that the SLWD can be expanded step by step with information about a plurality of Wi-Fi access points discovered by the mobile terminal and other mobile terminals. Hence, the SLWD implements a self-learning database of usable wireless networks. Further the SLWD can hold credentials, fed by external.

The multipath bundling system may include a communication interface, e.g. based on Wi-Fi, cellular or both (MBP), between the mobile terminal, in particular the WTD and the network entity, in particular the SLWD to provide the network entity with information how to expand the SLWD. The SCAA represents the algorithm for weighting existing Wi-Fi accesses via diverse information. The SCAA can run on the mobile terminal, the network entity or both or also on an external entity. Communication between the mobile terminal and the network entity, e.g. in the case that a portion of the SCAA is implemented on the mobile terminal and another portion of the SCAA is implemented on the network entity, can be realized via the above-mentioned communication interface. Adjustment or replication of the WTD and the SLWD is independent from this communication via the communication interface and can run in parallel.

In an exemplary implementation form of the multipath bundling system, the mobile terminal is configured to receive credentials for the at least one Wi-Fi access point from an authentication server, in particular via a cellular, Wi-Fi or MBP connection, and to store the credentials in the WTD of the mobile terminal.

This provides the advantage that the mobile terminal can utilize the discovered Wi-Fi access points for connecting to their respective Wi-Fi networks by using the received credentials.

In an exemplary implementation form of the multipath bundling system, the mobile terminal, respectively the WTD, is configured to expand or update the SLWD with the credentials for the at least one Wi-Fi access point.

This provides the advantage that the SLWD can learn credentials for discovered Wi-Fi connections from the mobile terminal and provide these credentials to other mobile terminals requesting access to the same Wi-Fi connections. This facilitates access to Wi-Fi networks stored in the SLWD.

In an exemplary implementation form of the multipath bundling system, the SCAA is configured to search for an optimal Wi-Fi parameter set for the mobile terminal based on comparing the input data received from the WTD and/or the SLWD in accordance with the optimization criterion and to assign known credentials to the optimal Wi-Fi parameter set.

This provides the advantage that all available access resources can be utilized in an efficient and flexible way by the operator. The operator can stay competitive in access business, can improve production, efficiency and flexibility, can improve user experience, and can drive Fixed Mobile Convergence (FMC).

In an exemplary implementation form of the multipath bundling system, the SCAA is configured to provide the mobile terminal with credentials of the at least one Wi-Fi connection that are not available from the WTD.

This provides the advantage that the mobile terminal can access Wi-Fi networks which are otherwise not accessible to the mobile terminal. The exchange between mobile terminal, respectively the WTD and SLWD allows the mobile terminal to exploit information about credentials stored in the SLWD which were created by other mobile terminals. That means, the mobile terminal can learn from experience of other mobile terminals. The multipath bundling system hence implements a self-learning system.

In an exemplary implementation form of the multipath bundling system, the mobile terminal is configured to connect to both the at least one cellular connection and the at least one Wi-Fi connection based on a traffic steering criterion, in particular based on a priority of a Wi-Fi connection over a cellular connection.

Benefits of having Wi-Fi as often connected as possible—that is, why a large Wi-Fi footprint is helpful—in case of multipath bundling and an appropriate traffic steering (e.g. Wi-Fi first) are the following: Higher data rates for the user due to multipath bundling; seamlessness due to multipath bundling; improving of reliability due to multipath bundling; due to an appropriate traffic steering, the mobile data volume of users is saved, that is, the costs are reduced because Wi-Fi compared to the cellular one is cheaper; and offloading of the mobile network due to an appropriate traffic steering.

In an exemplary implementation form of the multipath bundling system, the SCAA or specific functions the SCAA are implemented on the network entity or on the mobile terminal or on another entity of the multipath bundling system.

This provides a flexible design opportunity for the SCAA. The SCAA can be implemented on each entity of the system or functionality of the SCAA can be shared across different system entities. This results in a higher flexibility for system implementation.

According to a second aspect, the invention relates to a multipath bundling method, comprising: receiving input data from a Wireless Technologies Database (WTD) of a mobile terminal and/or a Self-Learning Wi-Fi Database (SLWD) of a network entity, in particular an external server or a multipath bundling server, the input data indicating information about wireless technologies, in particular information about at least one cellular connection and at least one Wi-Fi connection, usable by the mobile terminal for multipath bundling, and determining at least one Wi-Fi connection usable by the mobile terminal for multipath bundling based on the received input data in accordance with an optimization criterion.

Such a multipath bundling method efficiently exploits Wi-Fi networks for multipath bundling, in particular in moving scenarios where the mobile terminal detects a majority of protected Wi-Fi networks with unknown Wi-Fi credentials. The multipath bundling method provides connection of Wi-Fi networks and a multipath bundling protocol (MBP) combined with a prioritized traffic routing on a cheaper path for offloading cost intensive paths. The information about the current Wi-Fi situation can be exchanged with the network entity by using the mobile terminal, respectively the WTD. Intelligence, like machine learning processes, can be applied to weight the Wi-Fi networks on the network entity and/or the mobile terminal. The method may further apply credential management to improve the Wi-Fi discovery process.

In an exemplary implementation form, the multipath bundling method comprises: searching an optimal Wi-Fi parameter set for the mobile terminal based on comparing the input data received from the WTD and/or the SLWD in accordance with the optimization criterion; and assigning known credentials to the optimal Wi-Fi parameter set.

This provides the advantage that all available access resources can be utilized in an efficient and flexible way by the operator. The operator can stay competitive in access business, can improve production, efficiency and flexibility, can improve user experience, and can drive Fixed Mobile Convergence (FMC).

In an exemplary implementation form of the multipath bundling method, the optimization criterion is based on prioritized traffic routing, in particular based on offloading data from cost intensive paths to cheaper paths, in particular based on offloading traffic from cellular paths to Wi-Fi paths.

This provides the advantage that cheap traffic paths such as Wi-Fi connections can be prioritized over expensive traffic paths such as LTE connections. Data traffic can be arbitrarily distributed over the multipath bundle in order to achieve cost reduction. Cost does not inevitably mean a direct payment, it can also be defined in terms of latency, reliability, quality, availability and many others.

According to a third aspect, the invention relates to a computer readable non-transitory medium on which computer instructions are stored which, when executed by a computer, cause the computer to perform the method according to the second aspect of the invention.

According to a fourth aspect the invention relates to a computer program product comprising program code for performing the method according to the second aspect of the invention, when executed on a computer or a processor.

Embodiments of the invention can be implemented in hardware and/or software.

The following acronyms are applied in this disclosure:
FMC Fixed Mobile Convergence
MBP Multipath Bundling Protocol
MPTCP Multipath TCP
MT Mobile terminal
OSI Open System Interconnection
SCAA Search-Compare-Assign Algorithm
SLWD Self-Learning Wi-Fi Database of an external server
SSID Service Set Identifier
TCP Transport Control Protocol
Wi-Fi Wireless Fidelity
WTD Wireless Technologies Database of the MT In the following detailed description, reference is made to the accompanying drawings, which form part of the disclosure, and in which are shown, by way of illustration, exemplary aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIG. 1 shows a reference topology 100 for Hybrid Access (HA). The reference topology 100 illustrates the Home Network zone 110 with Customer Network 111 and Home Gateway with Hybrid Access Client 112, the Integrated Operator Network 120 with a variety of operator networks 121, 122, 123, 124, 125, 126 and the Internet zone 130 with the Internet 131. At the operator networks 121, 122, 123, 124, 125, 126 Hybrid Access algorithms and protocols 127 are implemented to connect the Hybrid Access Client 112 with the Hybrid Access Server 128 for connection with the Internet 131.

Hybrid Access (HA) combines at least two different network links with the same or different network technology; for example, it combines the access over the fixed network 122 with the access over the cellular network 121. FIG. 1 shows a typical scenario for HA but can also be implemented as an over the top (OTT) solution. The HA client 112 has at least two access interfaces, one for example for Digital Subscriber Line (DSL) access 122 and another one for example for access to the Long Term Evolution (LTE) network 121. The considerations on the HA algorithms are focused on a distributed client-server solution with client functionality in the residential gateway and server functionality (HA Server 128) in a data center at the network of the operator 126 or in the public Internet 131. However, multipath usage can be also directly applied on end devices, without having intermediate devices on behalf.

Figure 2:
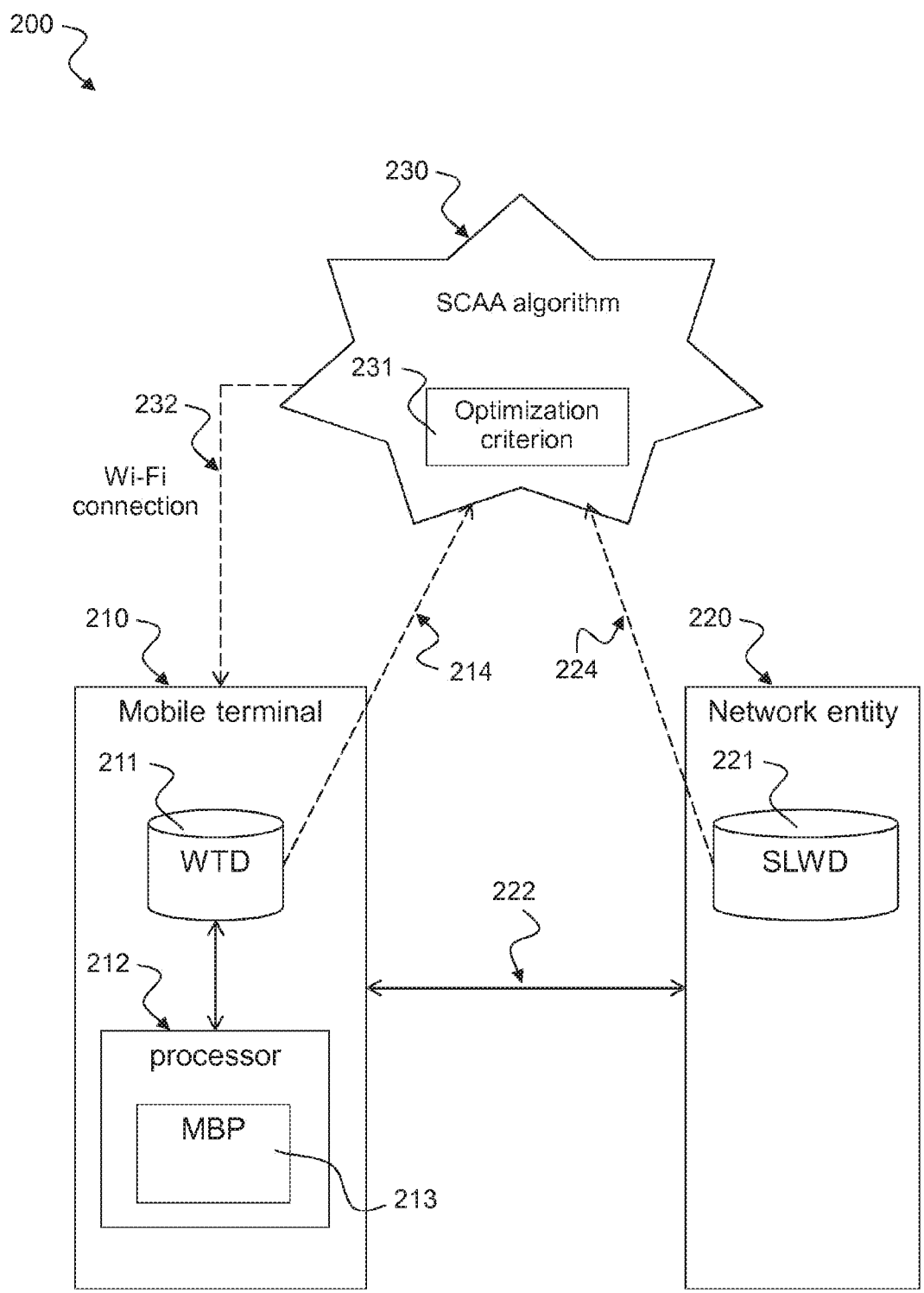
FIG. 2 shows a schematic diagram of a multipath bundling system 200 according to the disclosure with a mobile terminal 210, a network entity 220 and a Search-Compare-Assign Algorithm (SCAA)

FIG. 2 shows a schematic diagram of a multipath bundling system 200 according to the disclosure with a mobile terminal 210, a network entity 220 and a Search-Compare-Assign Algorithm (SCAA) 230. The multipath bundling system 200 comprises a mobile terminal 210 which includes a Wireless Technologies Database (WTD) 211 and a processor 212 configured to run a multipath bundling protocol (MBP) 213. The WTD 211 is a data base that can be used for storing wireless technologies, e.g. radio technologies such as WiFi, LTE, Bluetooth etc., in particular wireless technologies that can be used by the mobile terminal 210 to initiate a wireless connection, and information related to these wireless technologies. Particularly, the wireless technologies stored in the WTD 211 can be used by the mobile terminal 210 to initiate a multipath connection using the MBP 213.

The multipath bundling system 200 further comprises a network entity 220, for example an external server, e.g. an external server 320 as described below with respect to FIG. 3, or a multipath bundling server. The network entity 220 comprises a Self-Learning Wi-Fi Database (SLWD) 221. The SLWD 221 is a database that can be used for storing wireless technologies, e.g. the same wireless technologies as stored by the WTD 211 as described above, but in a larger scale. While the WTD 211 is used for storing wireless technologies as discovered by the mobile terminal 210, the SLWD 221 is used for storing wireless technologies known by the network, e.g. given by a network operator or learned from multiple mobile terminals connected to the network.

The multipath bundling system 200 further comprises a Search-Compare-Assign Algorithm (SCAA) 230, running on an entity of the multipath bundling system 200, e.g. on the mobile terminal 210 or on the network entity 220. The SCAA 230 may also be implemented on the mobile terminal 210 and the network entity 220, e.g. some functions of the SCAA 230 may be implemented on the mobile terminal 210 while other functions of the SCAA 230 may be implemented on the network entity 220.

The multipath bundling system 200 includes a communication interface 222, e.g. based on Wi-Fi, cellular or both (MBP) as communication link, between the mobile terminal 210, in particular the WTD 211 and the network entity 220, in particular the SLWD 221 that may be used to provide the network entity 220 with information how to expand the SLWD. For example, information 214, 224 and 232 may be exchanged via this interface 222. The SCAA 230 represents the algorithm for weighting existing Wi-Fi accesses via the diverse information received. The SCAA 230 can run on the mobile terminal 210, the network entity 220 or both or also on an external entity not depicted in FIG. 2. Communication between the mobile terminal 210 and the network entity 220, e.g. in the case that a portion of the SCAA 230 is implemented on the mobile terminal 210 and another portion of the SCAA 230 is implemented on the network entity 220, can be realized via the above-mentioned communication interface 222. Adjustment or replication of the WTD 211 and the SLWD 221 is independent from this communication via the communication interface 222 and can run in parallel.

The SCAA 230 is configured to receive input data 214, 224 from the WTD 211 and/or the SLWD 221, e.g. via the communication interface 222 between mobile terminal 210 and network entity 220. The input data 214, 224 indicates information about wireless technologies, in particular information about at least one cellular connection and at least one Wi-Fi connection, usable by the mobile terminal 210 for multipath bundling. The SCAA 230 is further configured to determine at least one Wi-Fi connection 232 usable by the mobile terminal 210 for multipath bundling based on the received input data 214, 224 in accordance with an optimization criterion 231. I.e. the SCAA 230 determines one or more suitable or optimal Wi-Fi connections. The cellular connection may be impacted as well, e.g., if the criterion decides to avoid cellular usage. The synchronization between WTD 211 and SLWD 221 may be based on a self-learning process where the SLWD 221 learns from the WTD 211 about Wi-Fi connections that are suitable for the mobile terminal 210 and the WTD 211 learns from the SLWD 221 about credentials for these suitable Wi-Fi connections in order to connect to a suitable (or optimal) Wi-Fi network.

The optimization criterion 231 may be based on prioritized traffic routing. For example, the optimization criterion 231 may be based on offloading data from cost intensive paths to cheaper paths, in particular based on offloading traffic from cellular paths to Wi-Fi paths.

The information about wireless technologies may comprise at least one of the following: Wi-Fi Service Set Identifier, SSID, of the at least one Wi-Fi connection 232, credentials of the Wi-Fi SSID, link quality of the Wi-Fi SSID, geolocation of the Wi-Fi SSID, channel characteristics of the at least one cellular connection, information about other wireless technologies than cellular or Wi-Fi, in particular information about at least one Bluetooth connection.

The mobile terminal 210 may be configured to determine at least one Wi-Fi access point in a local environment of the mobile terminal 210 and to store information about the at least one Wi-Fi access point in the WTD 211 of the mobile terminal 210.

The mobile terminal 210, respectively the WTD 211, may be configured to expand the SLWD 221 with the information about the at least one Wi-Fi access point.

The mobile terminal 210 may be configured to receive credentials for the at least one Wi-Fi access point from an authentication server, in particular via the at least one cellular connection, and to store the credentials in the WTD 211 of the mobile terminal 210. The mobile terminal 210, respectively the WTD 211, may be configured to expand or update the SLWD 221 with the credentials for the at least one Wi-Fi access point.

The SCAA 230 may be configured to search for an optimal Wi-Fi parameter set for the mobile terminal 210 based on comparing the input data 214, 224 received from the WTD 211 and/or the SLWD 221 in accordance with the optimization criterion 231 and to assign known credentials to the optimal Wi-Fi parameter set.

For example, the mobile terminal 210, respectively the WTD 211, may be configured to provide the mobile terminal 210 with credentials of the at least one Wi-Fi connection 232 that are not available from the WTD 211.

The mobile terminal 210 can connect to both the at least one cellular connection and the at least one Wi-Fi connection 232 based on a traffic steering criterion, in particular based on a priority of a Wi-Fi connection over a cellular connection.

The SCAA 230 or specific functions the SCAA 230 may be implemented on the network entity 220 or on the mobile terminal 210 or on another entity of the multipath bundling system 200.

As shown in FIG. 2, an implemented Multipath Bundling Protocol (MBP) 213 which may be implemented on the operating system (OS) of an end device 210 is the prerequisite for multipath usage. MPTCP is an exemplary implementation for an MBP. Exemplary embodiments of this disclosure can be applied to any MBP.

A requirement for multipath usage is to have multiple (at least two) connections available, which can be exploited, e.g. as shown in the scenario of FIG. 1. In the case of a smartphone, it is the simultaneous availability of the cellular and the Wi-Fi connectivity. A challenge is to exploit available Wi-Fi networks, especially when the user is on the move. The reason therefore is not the availability of Wi-Fi in general, it is more dedicated to the problem of unknown Wi-Fi credentials, particularly in case of a secured Wi-Fi network.

Benefits of having Wi-Fi as often connected as possible in case of multipath bundling and an appropriate traffic steering (e.g. Wi-Fi first) are the following:

Higher data rates for the user due to multipath bundling.

Seamlessness due to multipath bundling.

Improving of reliability due to multipath bundling.

Due to an appropriate traffic steering, the mobile data volume of users is saved, that is, the costs are reduced because Wi-Fi compared to the cellular one is cheaper.

Offloading of the mobile network due to an appropriate traffic steering.

Exemplary embodiments of this disclosure allow for utilization of all available access resources in an efficient and flexible way which is of basic strategic importance for an operator in order (1) to stay competitive in access business, (2) to improve production, efficiency and flexibility, (3) to improve user experience, and (4) to drive Fixed Mobile Convergence (FMC).

Figure 3:
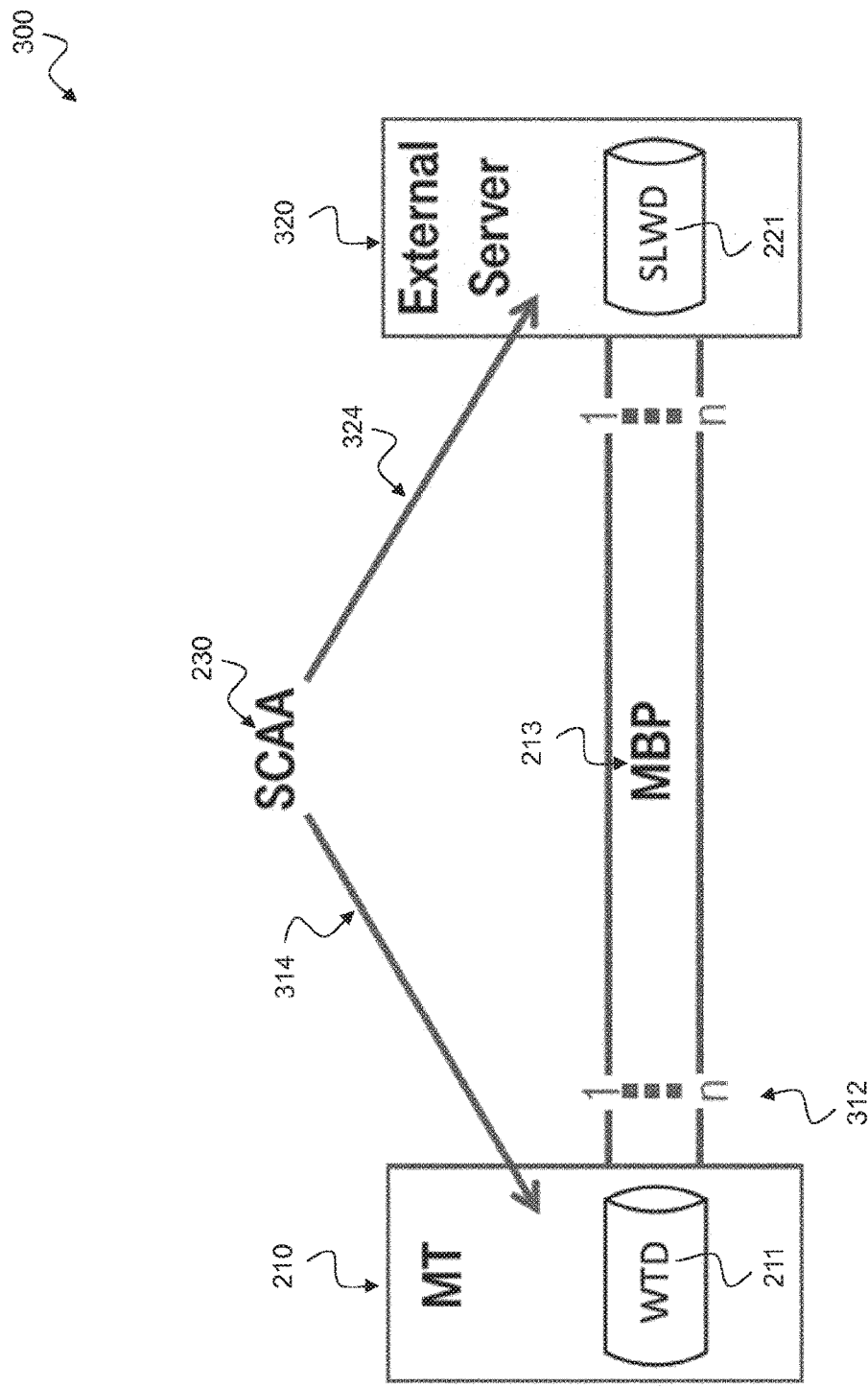
FIG. 3 shows an exemplary multipath bundling system 300 according to the disclosure which combines multipath bundling with a self-learning Wi-Fi weighting mechanism on an external entity.

FIG. 3 shows an exemplary multipath bundling system 300 according to the disclosure which combines multipath bundling with a self-learning Wi-Fi weighting mechanism on an external entity. The mobile terminal 210 comprises the Self-Learning Wi-Fi Database (SLWD) 221. The network entity 220 of FIG. 2 is implemented as external server 320 comprising the Self-Learning Wi-Fi Database (SLWD) 221. The mobile terminal 210 is multipath bundling enabled and in this exemplary implementation the mobile terminal 210 is coupled to the external server 320 via a multipath 312 on which a multipath bundling protocol (MBP) 213 is realized. The Search-Compare-Assign Algorithm (SCAA) 230 can interact 314, 324 with the mobile terminal 210 and the external server 320. The SCAA 230 can be implemented on the mobile terminal 210 or on the external server 320 or on another entity in the multipath bundling system 300.

The multipath bundling system 300 provides a solution for finding the Wi-Fi hotspots in the cell area of the mobile terminal 210 in order to provide it with the Wi-Fi credentials of these hotspots. The architecture includes the mobile terminal 210 including its Wireless Technologies Database (WTD) 211, the external server 320 including its Self-Learning Wi-Fi Database (SLWD) 221, and the Search-Compare-Assign Algorithm (SCAA) 230.

The WTD 211 contains all the information of the wireless technologies of the MT 210. This may include:
- all known Wi-Fi SSIDs of the MT 210 including its credentials if available;
- current Wi-Fi link quality analysis;
- geolocation;
- the cellular channel characteristic; and
- other information about other wireless technologies, e.g. Bluetooth, etc.

Figure 4:
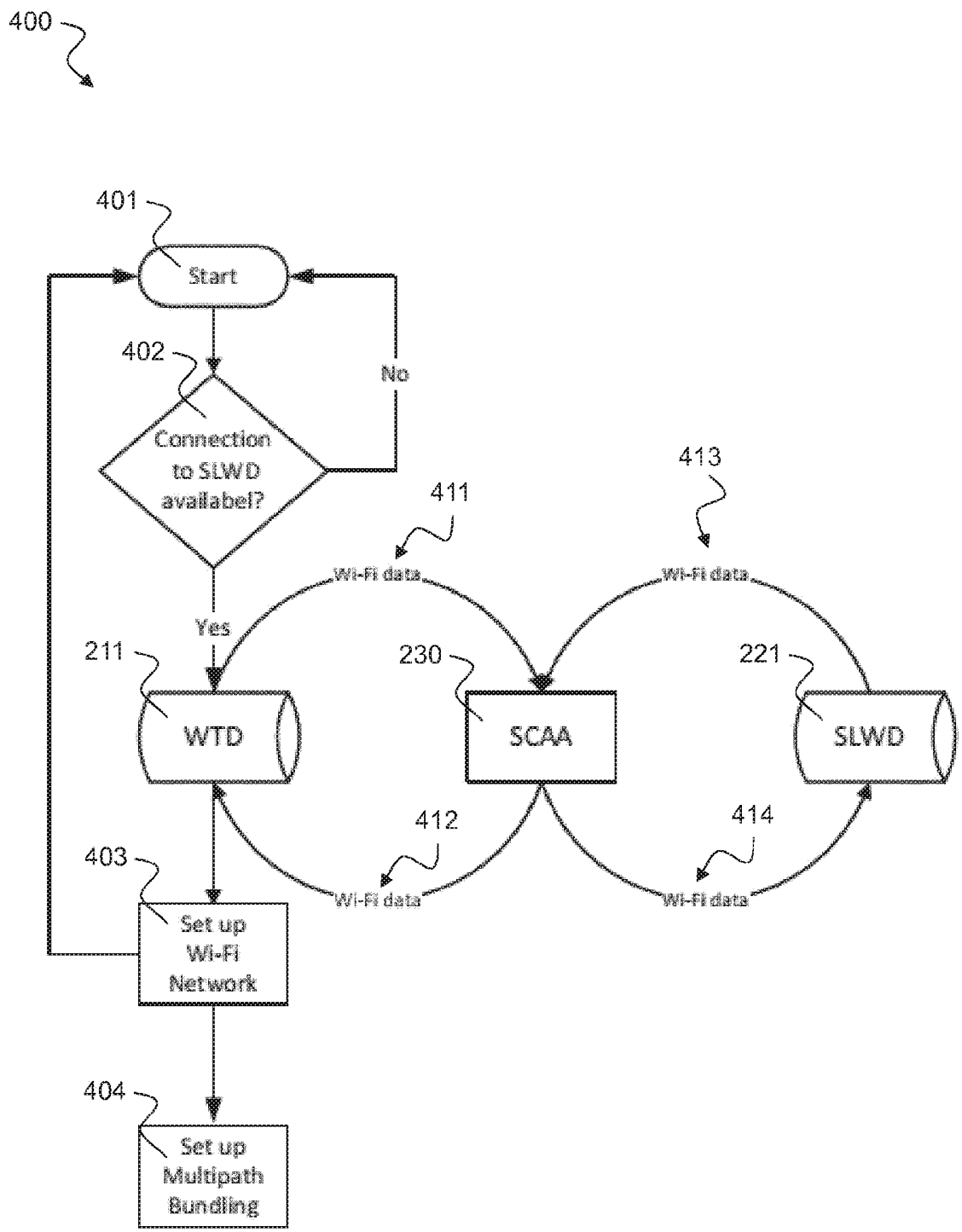
FIG. 4 shows a flow diagram for multipath bundling initiation 400 combined with self-learning Wi-Fi database processes according to the disclosure.

FIG. 4 shows a flow diagram for multipath bundling initiation 400 combined with self-learning Wi-Fi database processes according to the disclosure.

Anyway, whether the MT 210 has an available Wi-Fi connection or not, the SCAA 230 receives its input data 411, 412 from the WTD 211 of the mobile terminal 210 and also from the SLWD 221 of the external server 320 (or network entity 220). The SCAA 230 starts to work: search, compare, assign, i.e., it searches its list, compares the input data, assigns known credentials to SSIDs. The SCAA 230 provides the MT 210 with the optimal Wi-Fi parameter sets located in its cell or in its specified Wi-Fi radius. An algorithm automatically starts 401 on the MT 210, seeks out the best available Wi-Fi connection 402, 403 and sets it up for multipath bundling 404 according to the requirements of the MBP 213. Simultaneously, the SCAA 230 expands the database SLWD 221 with new data 413, 414 that it receives 411, 412 from the WTD 211.

The SCAA 230 can be completely independent, but it can also be implemented on the MT 210 or on the external server 320 (or network entity 220). Its function can also be split on the MT 210 and on the external server 320 (or network entity 220).

Figure 5:
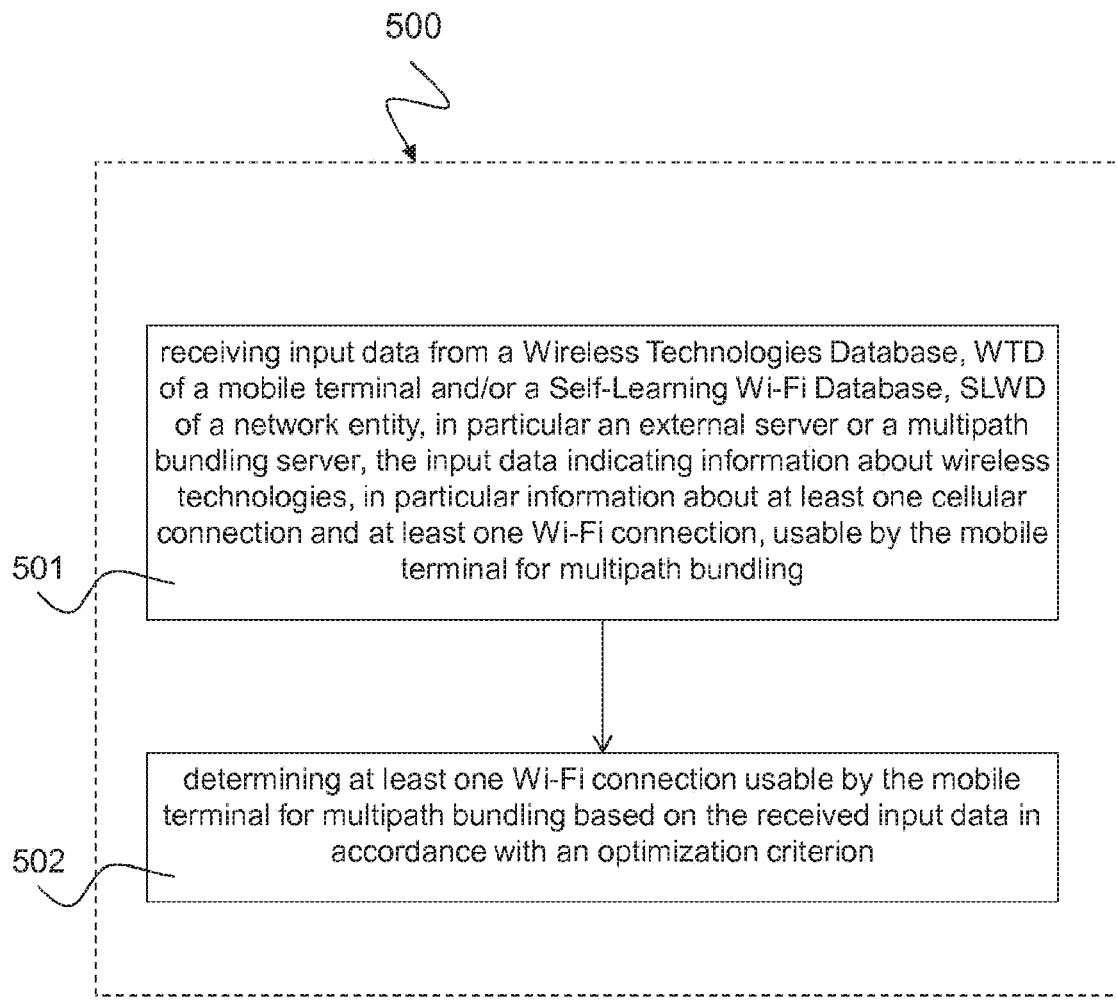
FIG. 5 shows a schematic diagram illustrating a multipath bundling method 500 according to the disclosure.

FIG. 5 shows a schematic diagram illustrating a multipath bundling method 500 according to the disclosure. The method 500 includes receiving 501 input data 214, 224 from a Wireless Technologies Database (WTD) 211 of a mobile terminal 210 and/or a Self-Learning Wi-Fi Database (SLWD) 221 of a network entity 220, in particular an external server 320 or a multipath bundling server, the input data 214, 224 indicating information about wireless technologies, in particular information about at least one cellular connection and at least one Wi-Fi connection, usable by the mobile terminal 210 for multipath bundling, e.g. as described above with respect to FIGS. 2 to 4.

The method 500 further includes determining 502 at least one Wi-Fi connection 232 usable by the mobile terminal 210 for multipath bundling based on the received input data in accordance with an optimization criterion 231, e.g. as described above with respect to FIGS. 2 to 4.

The method 500 may further comprise: searching an optimal Wi-Fi parameter set 411, 412, 413, 414 for the mobile terminal 210 based on comparing the input data 214, 224 received from the WTD 211 and/or the SLWD 221 in accordance with the optimization criterion 231, e.g. as described above with respect to FIGS. 2 to 4; and assigning known credentials to the optimal Wi-Fi parameter set.

The optimization criterion 231 may be based on prioritized traffic routing, in particular based on offloading data from cost intensive paths to cheaper paths, in particular based on offloading traffic from cellular paths to Wi-Fi paths, e.g. as described above with respect to FIGS. 2 to 4.

The method 500 may be implemented in a multipath bundling system 200, 300 as described above with respect to FIGS. 2 and 3, in particular on a mobile terminal 210 and a network entity 220 or an external server 320 as described above with respect to FIGS. 2 and 3.

The method 500 may include further steps, such as, for example, according to the computing blocks described above with reference to FIGS. 2 to 4.

The method 500 may be implemented on a computer. Another aspect of the invention relates to a computer readable non-transitory medium on which computer instructions are stored which, when executed by a computer, cause the computer to perform the method 500.

Another aspect of the invention is related to a computer program product comprising program code for performing the method 500 or the functionalities described above, when executed on a computer or a processor. The method 500 may be implemented as program code that may be stored on a non-transitory computer medium. The computer program product may implement the techniques described above with respect to FIGS. 2 to 4.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A multipath bundling system, comprising:
a mobile terminal, comprising:
a Wireless Technologies Database (WTD) configured to store information relating to wireless technologies discovered by the mobile terminal and usable by the mobile terminal to initiate a wireless connection; and
a processor configured to run a multipath bundling protocol (MBP); and
a network entity, wherein the network entity is an external server or a multipath bundling server, and wherein the network entity comprises a Self-Learning Wi-Fi Database (SLWD) configured to store information relating to network-known wireless technologies, including credentials for secured Wi-Fi networks learned from a plurality of mobile terminals;
wherein the mobile terminal is configured to:
after movement of the mobile terminal, detect one or more secured Wi-Fi networks having Wi-Fi credentials unknown to the mobile terminal;
obtain respective Wi-Fi credentials for a respective secured Wi-Fi network from the SLWD of the network entity;
determine that the respective secured Wi-Fi network is to be used for multipath bundling based on an optimization criterion, wherein the optimization criterion specifies that data is to be offloaded from a cellular path to a Wi-Fi path; and
use the respective secured Wi-Fi network for multipath bundling based on the obtained Wi-Fi credentials; and
wherein the WTD and the SLWD are configured to perform a self-learning process where the SLWD learns about Wi-Fi connections suitable for the mobile terminal from the WTD and the WTD learns from the SLWD about credentials for connecting to an optimal Wi-Fi network.

2. The multipath bundling system of claim 1, wherein the mobile terminal is further configured to obtain, from the SLWD and/or the WTD, at least one of the following:
a Wi-Fi Service Set Identifier (SSID) of the respective secured Wi-Fi network;
link quality of the Wi-Fi SSID;
geolocation of the Wi-Fi SSID;
channel characteristics of at least one cellular connection; or
information about at least one Bluetooth connection.

3. The multipath bundling system of claim 1, wherein the mobile terminal is configured to determine at least one Wi-Fi access point in a local environment of the mobile terminal and to store information about the at least one Wi-Fi access point in the WTD of the mobile terminal.

4. The multipath bundling system of claim 3, wherein the WTD of the mobile terminal is configured to expand the SLWD with the information about the at least one Wi-Fi access point.

5. The multipath bundling system of claim 3, wherein the mobile terminal is configured to receive credentials for the at least one Wi-Fi access point from an authentication server via a cellular, Wi-Fi or MBP connection, and to store the credentials in the WTD of the mobile terminal.

6. The multipath bundling system of claim 5, wherein the WTD is configured to expand or update the SLWD with the credentials for the at least one Wi-Fi access point.

7. The multipath bundling system of claim 1, wherein the mobile terminal and/or the network entity is further configured to:
search for an optimal Wi-Fi parameter set for the mobile terminal based on comparing the input data received from the WTD and/or the SLWD in accordance with the optimization criterion; and
assign known credentials to the optimal Wi-Fi parameter set.

8. The multipath bundling system of claim 1, wherein the mobile terminal is configured to connect to both at least one cellular connection and at least one Wi-Fi connection based on a priority of a Wi-Fi connection over a cellular connection.

9. A multipath bundling method, comprising:
after movement of a mobile terminal, detecting, by the mobile terminal, one or more secured Wi-Fi networks having Wi-Fi credentials unknown to the mobile terminal, wherein the mobile terminal comprises a Wireless Technologies Database (WTD), wherein the WTD stores information relating to wireless technologies discovered by the mobile terminal and usable by the mobile terminal to initiate a wireless connection;

obtaining, by the mobile terminal, respective Wi-Fi credentials for a respective secured Wi-Fi network from a Self-Learning Wi-Fi Database (SLWD) of a network entity, wherein the network entity is an external server or a multipath bundling server, and wherein the SLWD stores information relating to network-known wireless technologies, including credentials for secured Wi-Fi networks learned from a plurality of mobile terminals;

determining, by the mobile terminal, that the respective secured Wi-Fi network is to be used for multipath bundling based on an optimization criterion, wherein the optimization criterion specifies that data is to be offloaded from a cellular path to a Wi-Fi path; and using, by the mobile terminal, the respective secured Wi-Fi network for multipath bundling based on the obtained Wi-Fi credentials;

wherein the method further comprises: performing, by the WTD and the SLWD, a self-learning process where the SLWD learns about Wi-Fi connections suitable for the mobile terminal from the WTD and the WTD learns from the SLWD about credentials for connecting to an optimal Wi-Fi network.

10. The multipath bundling method of claim 9, further comprising:

searching for an optimal Wi-Fi parameter set for the mobile terminal based on input data received from the WTD of the mobile terminal and/or from the SLWD and the optimization criterion; and assigning known credentials to the optimal Wi-Fi parameter set.

* * * * *